(12) United States Patent
Parrish

(10) Patent No.: US 12,035,711 B2
(45) Date of Patent: Jul. 16, 2024

(54) AGRICULTURAL ADJUVANT

(71) Applicant: AGQUAM LLC, Spokane, WA (US)

(72) Inventor: Scott K. Parrish, Spokane, WA (US)

( * ) Notice: Subject to any disclaimer, the term of this patent is extended or adjusted under 35 U.S.C. 154(b) by 84 days.

(21) Appl. No.: 16/099,919

(22) PCT Filed: May 5, 2017

(86) PCT No.: PCT/US2017/031208
§ 371 (c)(1),
(2) Date: Nov. 8, 2018

(87) PCT Pub. No.: WO2017/196650
PCT Pub. Date: Nov. 16, 2017

(65) Prior Publication Data
US 2019/0174751 A1   Jun. 13, 2019

Related U.S. Application Data

(60) Provisional application No. 62/334,760, filed on May 11, 2016.

(51) Int. Cl.
| | | |
|---|---|---|
| *A01N 25/30* | (2006.01) | |
| *A01N 25/04* | (2006.01) | |
| *A01N 37/40* | (2006.01) | |
| *A01N 39/04* | (2006.01) | |
| *A01N 57/20* | (2006.01) | |

(52) U.S. Cl.
CPC .............. *A01N 25/30* (2013.01); *A01N 25/04* (2013.01); *A01N 37/40* (2013.01); *A01N 39/04* (2013.01); *A01N 57/20* (2013.01)

(58) Field of Classification Search
CPC ........ A01N 39/04; A01N 57/20; A01N 37/40; A01N 25/04; A01N 25/30

USPC ......................................................... 504/127
See application file for complete search history.

(56) References Cited

U.S. PATENT DOCUMENTS

| | | |
|---|---|---|
| 5,118,444 A | 6/1992 | Nguyen |
| 5,317,003 A | 5/1994 | Kassebaum et al. |
| 5,652,197 A | 7/1997 | Claude et al. |
| 5,668,085 A | 9/1997 | Forbes et al. |
| 5,750,468 A | 5/1998 | Wright et al. |
| 6,797,673 B1 | 9/2004 | Worthley et al. |
| 8,987,167 B2 | 3/2015 | Xu et al. |
| 2012/0142532 A1 | 6/2012 | Wright et al. |
| 2015/0031539 A1 | 1/2015 | Schnabel et al. |
| 2015/0045224 A1* | 2/2015 | Parrish ..................... C05G 3/70 504/206 |

FOREIGN PATENT DOCUMENTS

| | | | |
|---|---|---|---|
| CN | 104365591 A | * 2/2015 | |
| WO | WO-2013017402 A1 | * 2/2013 | ............. A01N 25/00 |

OTHER PUBLICATIONS

International Search Report, International Application No. PCT/US2017/031208, dated Jul. 20, 2017, 4 pages.
Supplementary European Search Report, EP 17 79 6598, dated Oct. 31, 2019, 7 pages.

* cited by examiner

*Primary Examiner* — Michael B. Pallay
(74) *Attorney, Agent, or Firm* — Dicke, Billig & Czaja, PLLC

(57) ABSTRACT

Described are agricultural adjuvants that include oil, surfactant, and emulsifier, well as methods of preparing these adjuvants and methods of using these adjuvants in combination with a herbicide composition.

24 Claims, No Drawings

AGRICULTURAL ADJUVANT

PRIORITY

This application claims priority to International Application No. PCT/US2017/031208, filed on May 5, 2017, which claims the benefit of U.S. Provisional Patent Application No. 62/334,760, filed May 11, 2016, the entire contents of which are incorporated herein by reference in their entireties, for all purposes.

FIELD OF THE INVENTION

The invention relates to agricultural adjuvants that include oil, surfactant, and emulsifier, as well as methods of preparing these adjuvants and methods of using these adjuvants in combination with a herbicide composition.

BACKGROUND

Glyphosate is likely the most used herbicide in the world. This is due to its effectiveness and its simple use pattern: "If glyphosate touches a plant, that plant dies." Monsanto introduced GMO plants engineered to be tolerant of glyphosate in 1996. Most of the corn and soybeans grown worldwide are glyphosate-tolerant.

Over time, especially during the past ten years, glyphosate-tolerant weeds have developed. During the last several years chemical producers such as Monsanto, BASF, and DOW, have researched ways to manage glyphosate resistance in weeds. One strategy has been to apply glyphosate in combination with another type of herbicide, e.g., an auxin herbicide such as dicamba or 2,4-D.

Both soybeans and cotton are very sensitive to 2,4-D and dicamba, as are many broadleaf crops. Research has shown that current commonly-used salts of 2,4-D and dicamba have relatively high volatility. To reduce levels of volatility, new salts of these herbicides have been developed. One example is the choline salt of 2,4-D. Another example is the N,N-Bis-(aminopropyl) methylamine (BAMPA) salt of dicamba. At the same time, dicamba-tolerant and glyphosate-tolerant crops are being developed, including double stacked gene systems for tolerance to 2,4-D and glyphosate, or dicamba and glyphosate.

These combined research paths, including using glyphosate in combination with 2,4-D or dicamba, lead to another complication, which is that glyphosate is often used with AMS (ammonium sulfate), and ANS can increase the volatility of auxin herbicides such as salts of 2,4-D or dicamba. The result is that AMS will not be useful as an additive to glyphosate when mixed with 2,4-D or dicamba. Additives that are mixed with glyphosate and 2,4-D (e.g., the choline salt), dicamba (e.g., the BAPMA salt), or both of these, will not be allowed to be used in these combinations if the result is an increase in the volatility of 2,4-D or dicamba. Some alternatives to AMS already are available commercially, including oil-based or water-based acidic adjuvants sold by Agrasyst LLC (Spokane, WA) under the trade names LOAD OUT, FULL LOAD, LOAD UP, and FULL LOAD COMPLETE.

More generally, volatility, as well as drift (spray drift) problems, are commonly associated with auxin herbicides even in the absence of glyphosate or AMS. Volatile auxin herbicides can, under certain conditions of application, vaporize into the surrounding atmosphere and thereby migrate from an application site to adjacent crop plants such as soybeans and cotton, where contact damage to sensitive plants can occur. Spray drift can be attributed to volatility as well as to the physical movement of small particles, such as spray droplet particles, from the target site to adjacent crop plants. Various additives have been proposed for use with auxin herbicides to reduce volatility. United States Patent Publication 2012/0142532, titled "Low Volatility Auxin Herbicide Formulations," describes using polybasic polymer to reduce volatility of auxin herbicide; U.S. Pat. No. 8,987,167 describes cationic polyamine compounds for reducing volatility of a herbicide such as 2,4-D and dicamba.

There is ongoing need for low volatility auxin herbicide formulations that are efficacious yet non-phytotoxic to sensitive crops located in areas adjacent to the target site, such as auxin formulations that exhibit relatively low volatility and physical drift. Optionally, the herbicide formulation can be prepared by adding an adjuvant to the auxin herbicide formulation (e.g., just prior to use) that includes ingredients that provide low volatility, reduced drift, or both.

Separately, there is a need for adjuvants for use with herbicide compositions, especially (but not only) herbicide compositions that contain an auxin herbicide such as 2,4-D, dicamba, or both, optionally in the presence of glyphosate. The adjuvant should be effective to improve the efficacy or efficiency of the herbicide (glyphosate, auxin herbicide, or both), and should not increase but can preferably decrease the volatility of the herbicide, e.g., the auxin herbicide.

SUMMARY

According to the following description, oil-based agricultural adjuvants have been identified that provide useful or improved efficacy and useful or improved (i.e., reduced) volatility and drift properties when included in an aqueous herbicide application composition. An adjuvant as described is an oil-based composition that contains oil, amine surfactant, lecithin, and emulsifier. The adjuvant preferably contains a low amount of water. The adjuvant can be combined with water and active herbicide (such as a herbicide concentrate and spray water) to produce an aqueous herbicide application composition that can be applied by spraying to soil or an unwanted plant.

Advantageously, in particular embodiments, the adjuvant can be included in an aqueous liquid herbicide composition, especially one that contains an auxin herbicide such as 2,4-D or dicamba, optionally in combination with glyphosate, to produce a herbicide application composition with useful or advantageous volatility or drift properties. Embodiments of the described adjuvant can reduce the volatility of auxin herbicide in a herbicide application composition. When a herbicide application composition as described, is formed, the volatility of the auxin herbicide in the herbicide application composition that contains the adjuvant is not increased and is preferably decreased, preferably substantially, relative to the volatility of the auxin herbicide in a comparable herbicide application composition that does not include the adjuvant. These exemplary adjuvants are useful to reduce the volatility of auxin herbicides that include dicamba salts and 2,4-D salts, including salts that include a large counterion in an effort to reduce volatility of the active auxin herbicide, such as relatively large amine salts, specifically including the choline salt of 2,4-D and the N,N-Bis-(aminopropyl) methylamine (BAMPA) salt of dicamba.

According to certain embodiments, the amine surfactant can be a cationic amine surfactant, e.g., tallow amine. The combination of amine surfactant (e.g., tallow amine) with lecithin in an adjuvant that is combined with a herbicide application composition that contains auxin herbicide can substantially reduce the volatility of the auxin herbicide, even though the lecithin alone may not reduce the volatility of the auxin herbicide.

According to these and other embodiments of adjuvants as described, the combination of amine surfactant, lecithin, and emulsifier in an adjuvant combined with a herbicide application composition that contains auxin herbicide, can reduce the volatility of the auxin herbicide to a degree that is substantially lower than a comparable adjuvant that contains the same amine surfactant and the lecithin but not the emulsifier. More generally, the combination of amine surfactant with lecithin and emulsifier can produce an adjuvant that reduces volatility of auxin herbicide as compared to other combinations surfactants, lecithin, and emulsifier, e.g. a single emulsifier.

The emulsifier may be non-ionic, cationic, or anionic. Preferred adjuvants contain a combination of two or more different emulsifiers. In particular embodiments, an adjuvant can contain a first emulsifier that has a high hydrophilic-lipophilic balance (HLB) (e.g., greater than 10, 11, 12, 13, or 14) in combination with a second emulsifier that has a low HLB (e.g., less than 8, 7, 6, 5, or less than 4).

The adjuvant, containing amine surfactant, lecithin, emulsifier, and optional ingredients as described herein, can be prepared by any method. According to certain preferred methods the adjuvant can be prepared by first providing oil or oil ingredient, then stirring lecithin into the oil or oil ingredient with continuous mixing until the lecithin is completely dissolved. Amine surfactant and emulsifier (e.g., combination of anionic emulsifier and nonionic emulsifier) then can be added to the mixture of oil and lecithin, e.g., separately, in any order, with continuous mixing.

Volatility (or volatization) of an active herbicide compound in a herbicide application composition is a known and well understood property of active herbicide compounds and can be measured by various procedures known in the agriculture and agriculture chemical arts. One example is by distilling a herbicide composition and analyzing the distillation condensate, or the distilled composition, for herbicide content. Alternately, a gas stream can be passed over a herbicide composition into which the active herbicide compound volatilizes. The composition of the gas stream can be analyzed by known quantitative methods to determine the amount of active herbicide compound it contains, which is derived from the herbicide composition.

According to preferred adjuvants of the present description, the volatility of an active herbicide compound in a herbicide application composition can be reduced due to the presence of the adjuvant, or, alternatively, due to the presence of the materials ("ingredients," including types and amounts) of the adjuvant in the herbicide application composition (if provided in a form other than an "adjuvant" composition as defined herein, e.g., if provided as separate ingredients that if provided in combination would form an adjuvant). Accordingly, a herbicide application composition that contains the adjuvant, or that otherwise contains the same types and amounts of materials of the adjuvant, can exhibit reduced volatility of active herbicide compound (e.g., auxin herbicide) as compared to the volatility of the active herbicide compound in a herbicide application composition that is otherwise similar or identical but without the adjuvant (or the materials of the adjuvant). The comparison can be made by measuring (in a consistent manner) volatility of an active herbicide compound in a herbicide application composition both with and without the adjuvant or the materials of the adjuvant.

Preferred adjuvant compositions can also reduce the level of unwanted "drift" of a herbicide application composition that contains the adjuvant or the ingredients of the adjuvant. Drift refers to the degree to which small droplets of herbicide application composition, applied by spraying, are carried through the air to off-target vegetation. Drift is a known property of herbicide application compositions applied by spraying, and can be measured by known techniques.

According to certain embodiments of adjuvants of the present description, the amount of drift of a herbicide application composition applied by spraying can be reduced due to the presence of the adjuvant, or, alternatively, due to the presence of the materials ("ingredients," including types and amounts) of the adjuvant in the herbicide application composition (if provided in a form other than an "adjuvant" as defined herein, e.g., if provided as separate ingredients that if provided in combination would form an adjuvant). Accordingly, a herbicide application composition that contains the adjuvant, or the same types and amounts of materials of the adjuvant, can exhibit reduced drift, when compared to the amount of drift that is seen in a herbicide application composition that is otherwise similar or identical but without the adjuvant (or the materials of the adjuvant). The comparison can be made by measuring (in a consistent manner) the amount of drift that occurs by application of a herbicide application composition by spraying, both with and without the adjuvant or the materials of the adjuvant.

In one aspect the invention relates to agricultural adjuvant that includes: up to 60 parts by weight amine surfactant, from 5 to 90 parts by weight oil, lecithin, emulsifier, and less than 10 parts by weight water, based on 100 parts by weight adjuvant (e.g., based on 100 parts by weight total: amine surfactant or amine surfactant ingredient, oil or oil ingredient, lecithin or lecithin ingredient, and emulsifier or emulsifier ingredient) wherein, when combined with a herbicide composition that contains auxin herbicide, the volatility of the auxin herbicide of the combination of herbicide composition and adjuvant composition does not increase.

In another aspect the invention relates to a composition that includes from 5 to 60 parts by weight amine surfactant, from 20 to 90 parts by weight oil, lecithin, and emulsifier, based on 100 parts by weight amine surfactant, oil, lecithin, and emulsifier.

In other aspects the invention relates to methods of preparing a herbicide composition. The methods include: providing a herbicide composition, providing adjuvant as described and claimed herein, and combining the herbicide composition with the adjuvant.

DETAILED DESCRIPTION

The following describes adjuvant compositions and their constituent materials ("adjuvant materials"), and their use in herbicide compositions.

An adjuvant is a composition that contains adjuvant materials as described herein, and that may be combined with aqueous herbicide composition to form a herbicide application composition for application to soil or plants.

The herbicide application composition may be formed by combining a concentrated herbicide composition (e.g., "herbicide concentrate") with water, and with the adjuvant, in any order, to provide an aqueous herbicide application composition that contains the adjuvant materials and that exhibits useful or advantageous performance, such as reduced volatility of a herbicide, e.g., an auxin herbicide, and optionally reduced loss or off-target application due to drift.

Alternately, a herbicide application composition that includes the same materials as the adjuvant, in the same relative amounts, may be formed by other steps that do not necessarily include adding a discrete "adjuvant" composition as described herein. In specific, a herbicide application composition as described herein can be one that, regardless of the manner or method of its formation, contains adjuvant materials in relative amounts described herein, such that the aqueous herbicide application composition exhibits useful or advantageous performance, such as reduced volatility of a herbicide, e.g., an auxin herbicide, and optionally reduced loss or off-target application due to drift. To form this composition, the adjuvant materials may be added separately, e.g., as part of one or more different ingredients (e.g., a herbicide concentrate; an oil or oil ingredient; surfactant; a combination of oil and surfactant, emulsifier, or both; a lecithin ingredient; or an adjuvant or additive that is different from an adjuvant as described herein) added separately into a herbicide application composition that when applied contains the same materials as are in the adjuvant composition as described (the "adjuvant materials"), in the same relative amounts, but without a step of adding the ingredients of an "adjuvant" in the form of a single composition.

An agricultural adjuvant (or simply "adjuvant," for convenience) of the present description is an oil-based composition, preferably a solution, that contains adjuvant materials that include oil (or oil ingredient), amine surfactant (or amine surfactant ingredient), lecithin (or lecithin ingredient), and emulsifier (or emulsifier ingredient). The adjuvant preferably contains a low amount of water and preferably forms a stable oil-in-water emulsion when combined with water, such as in a spray tank.

The adjuvant can be combined with a herbicide composition, especially one that contains an auxin herbicide, optionally with other ingredients, to produce a herbicide application composition. The adjuvant, when included in the herbicide application composition, can effectively reduce the volatility of an active herbicide compound (e.g., an auxin herbicide compound) that is present in the herbicide application composition; the volatility of the (e.g., auxin) herbicide compound in the herbicide application composition that contains the adjuvant (or the adjuvant materials) is not increased and is preferably decreased, preferably substantially, relative to the volatility of the same (e.g., auxin) herbicide compound in a comparable herbicide application composition that does not include the adjuvant (or the adjuvant materials). In particular embodiments, the volatility of an active herbicide compound, e.g., auxin herbicide such as a dicamba salt or a 2,4-D salt, can be reduced by as much as 20, 30, or 50 percent, e.g., 60, 70, or 80 percent, meaning that the volatility of the active herbicide compound in the herbicide application composition that contains the adjuvant or the adjuvant materials is 80 percent (or less) compared to the volatility of the same active herbicide compound in a comparable herbicide application composition that does not contain the adjuvant or the adjuvant materials, e.g., the volatility is 70, 50, 40, 30, or 20 percent, or less, of the volatility of the same active herbicide compound in a comparable herbicide application composition that does not contain the adjuvant or the adjuvant materials, when these measurements are made in a consistent manner.

Optionally and preferably the adjuvant (or adjuvant materials) can have a desired effect, e.g., improvement, on drift properties of the herbicide application composition. When such a herbicide application composition is formed, including the adjuvant or the adjuvant materials, the amount of drift that occurs during spray application of the herbicide application composition can be reduced relative to the amount of drift that occurs during spray application of a comparable herbicide application composition that does not include the adjuvant (or the adjuvant materials). In particular embodiments, the amount of drift of the herbicide application composition can be reduced by as much as 20, 30, or 50 percent, e.g., 60, 70, or 80 percent, meaning that the amount of drift that occurs upon spraying the herbicide application composition that contains the adjuvant or the adjuvant materials is 80 percent (or less) compared to the amount of drift of a comparable herbicide application composition that does not contain the adjuvant or the adjuvant materials, e.g., the amount of drift is 70, 50, 40, 30, or 20 percent, or less, compared to the amount of drift of a comparable herbicide application composition that does not contain the adjuvant or the adjuvant materials, when these measurements are made in a consistent manner.

A preferred adjuvant is a non-aqueous solution that is substantially free of precipitates, substantially free of coagulation, that is flowable (pourable and preferably pumpable, e.g., at 72 degrees Fahrenheit), and that can combine with a herbicide composition (e.g., prepared from herbicide concentrate and spray water) to form a flowable (pourable, pumpable, and sprayable, e.g., at 72 degrees Fahrenheit) aqueous herbicide application composition suitable for application by spraying onto soil, a crop plant, or a weed. The adjuvant can be clear (color-less) or colored and transparent, and should not be cloudy, phase separated, or contain crystals, undissolved solids, or precipitate. Preferred adjuvants are storage-stable for weeks (up to 12 weeks) or months (up to 3, 4, 5, or 6 months) at ambient temperature (72 degrees Fahrenheit) (preferably up to 90 or 100 F) without forming precipitate, without coagulation, and in a form that remains flowable (pourable and pumpable, e.g., at 72 degrees Fahrenheit) and water miscible.

Preferred adjuvants can contain no more than a small amount of water. Water may be present in the adjuvant by being present in an ingredient that is used to prepare the adjuvant, such as in an ingredient that contains oil, lecithin, amine surfactant, emulsifier, or optional inorganic acid ingredient. Of these, very little if any water should be present in the amine surfactant ingredient, the oil, lecithin, and emulsifier. No water needs to be added to the adjuvant composition in the form of plain water. Preferred adjuvants can include not more than 10, 5, 3, 2, or 1 percent total water based on the total weight of the adjuvant, from any source, such as water contained in a liquid ingredient of the adjuvant.

The adjuvant can be combined with a herbicide composition, which may be a concentrated herbicide composition (e.g., "herbicide concentrate") or a diluted herbicide composition (e.g., "herbicide application composition").

The herbicide composition can contain an auxin herbicide. Auxin herbicides include 2,4-D (2,4-dichlorophenoxyacetic acid), 2,4-DB (4-(2,4-dichlorophenoxy)butanoic acid), dichloroprop (2-(2,4-dichlorophenoxy)propanoic acid), MCPA ((4-chloro-2-methylphenoxy)acetic acid), MCPB (4-(4-chloro-2-methylphenoxy)butanoic acid), aminopyralid (4-amino-3,6-dichloro-2-pyridinecarboxylic acid), clopyralid (3,6-dichloro-2-pyridinecarboxylic acid), fluoroxypyr ([(4-amino-3,5-dichloro-6-fluoro-2-pyridinyl)oxy]acetic acid), triclopyr ([(3,5,6-trichloro-2-pyridinyl)oxy]acetic acid), diclopyr, mecoprop (2-(4-chloro-2-methylphenoxy)propanoic acid) and mecoprop-P, dicamba (3,6-dichloro-2-methoxybenzoic acid), picloram (4-amino-3,5,6-trichloro-2-pyridinecarboxylic acid), quinclorac (3,7-dichloro-8-quinolinecarboxylic acid), aminocyclopyrachlor (6-amino-5-chloro-2-cyclopropyl-4-pyrimidinecarboxylic acid), agriculturally acceptable salts of any of these herbicides, racemic mixtures and resolved isomers thereof, and mixtures thereof.

An example of a widely used auxin herbicide is dicamba, which is often sold in salt form, for example the sodium, dimethylamine, isopropylamine, or diglycolamine salt. More recently, in an effort to reduce the volatility of dicamba, salts having a counterion with a relatively higher molecular weight have been proposed, including the N,N-Bis-(aminopropyl) methylamine (BAMPA) salt of dicamba.

Another example of a widely used auxin herbicide composition is 2,4-D, which is sold in the form of an amine, a sodium salt, a choline salt, and as a dimethyl amine salt.

The herbicide composition can also, optionally, contain glyphosate (N-(phosphonomethyl)glycine), which is a known herbicide. Glyphosate is available in the acid form, referred to as glyphosate acid, and is also available in its various salt forms, such as its isopropylamine (IPA) salt form. Glyphosate is sold as the isopropylamine salt under the trade name Roundup®.

The adjuvant contains amine surfactant of a type and in an amount that are useful as an ingredient of a stable adjuvant composition, and that will provide good surfactant functionality in a herbicide application composition derived from the adjuvant. A useful amine surfactant can be combined with oil and other ingredients of the adjuvant in a manner that produces a uniform and stable liquid, e.g., solution. Preferred amine surfactant can be used to produce an adjuvant that, when included in a herbicide application composition, will affect the surface tension of the herbicide application composition in a manner that improves the effectiveness of one or more active herbicide compounds of the application composition, in killing an unwanted plant (e.g., weed), when the application composition is applied by spraying.

As used herein the term "surfactant" refers to an organic compound that lowers the surface tension (or interfacial tension) between two liquids or between a liquid and a solid, typically an organic amphiphilic compound that contains a hydrophobic group (e.g., a hydrocarbon (e.g., alkyl) "tail") and a hydrophilic group. An "amine surfactant" is a surfactant that includes an amine group, e.g., primary amine, secondary amine, tertiary amine, or a quaternary ammonium.

Exemplary amine surfactants can include an amine group such as octyl amine, lauryl amine, stearyl amine, oleyl amine, tallow amine, cetylamine, N-tetradecyl amine, cocoamine, hydrogenated tallow amine, di(hydrogenated) tallow amine, ethoxylated tallow amine (e.g., polyoxyethyleneamine or POEA) dicocoalkyl amine, N-tridecyltridecanamine, N-methylstearylamine, distearyl amine, and dialkyl (C8-C20) amine. Certain preferred amine surfactants for use in an adjuvant as described include cationic amine surfactants, meaning surfactants that are cationic at conditions (including pH) of a herbicide application composition. Examples include alkyl dimethylamines.

Alkyl amine surfactants are known and commercially available, including polyalkoxylated amine surfactants, for example polyoxyethyleneamine (POEA) surfactants. Example commercial alkyl amine surfactants include tallow amine surfactants sold under the trade name Surfonic® T series, Ultramina® (ethoxylated fatty amines), Tomamine (from Air Products), among others. U.S. Pat. No. 5,668,085 to Forbes et al., the entirety of which is incorporated herein by reference, describes polyoxyethylene C8-22 alkylamine surfactants having an average of up to about eight oxyethylene units per molecule. These can be represented by the formula:

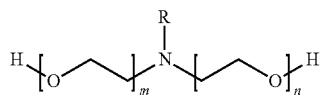

where R represents a straight- or branched-chain alkyl or alkenyl group having from about 8 to about 22 carbon atoms, and n and m are integers such that n+m has a value of about 2 to about 8, including mixtures of such amines having different groups R, the average number of carbon atoms in the groups R being from about 8 to about 22, also including a mixture of such amines having different values of n and m, n and m being integers such that the average value of n+m in the mixture is about 2 to about 8, R having a single value or an average value as in a mixture.

Other amine surfactants include those described in the following patent documents. U.S. Pat. No. 5,317,003 to Kassebaum & Berk (incorporated herein by reference) describes compositions that contain a quaternary polyoxyethylene C6-14 di-alkylammonium surfactant having about 5 to about 50 oxyethylene units per molecule. U.S. Pat. No. 5,652,197 to Claude et al. (also incorporated herein by reference) describes quaternary polyoxypropylene oxyethylene tri-(C1-3 alkyl)ammonium surfactants having 2 to 20 oxypropylene units per molecule. U.S. Pat. No. 5,118,444 (incorporated herein by reference) to Nguyen describes polyoxyethylene C6-20 alkylamine oxide surfactants having about 5 to about 25 oxyethylene units per molecule. U.S. Pat. No. 5,750,468 to Wright (incorporated herein by reference) describes compositions that contain a polyoxyethylene tertiary alkyletheramine, polyoxyethylene quaternary alkyletherammonium, or polyoxyethylene alkyletheramine oxide surfactant.

The amine surfactant can be liquid at ambient temperature, such as at a temperature in a range from 40 to 70 degrees Fahrenheit. As used herein, the term "amine surfactant" is used to refer to the compounds chemically defined herein as surface active surfactant compounds. The term "amine surfactant ingredient" refers to a composition that includes a high concentration of amine surfactant compound such as at least 70, 80, 90, or 95 percent amine surfactant compound. The amine surfactant compound can be one constituent of the amine surfactant ingredient, which can optionally contain low amounts of water and non-amine surfactant materials (e.g., impurities or co-ingredients), preferably less than 10, 5, 2, or 1 percent of these or other non-surfactant materials based on the total weight of the amine surfactant ingredient. When used in the present application and claims, the term "amine surfactant" refers to an amine surfactant compounds itself, and the term "amine surfactant ingredient" refers to a composition that contains one or more amine surfactant (compound), which may be a commercially obtained material, which can also include low levels of non-amine surfactant co-ingredients, impurities, solvent, or water.

The amount of amine surfactant or amine surfactant ingredient included in the adjuvant can be any amount that will be useful to function as desired, e.g., to improve efficacy of an active herbicide compound in a herbicide application composition that contains the adjuvant. Exemplary amounts of amine surfactant or amine surfactant ingredient in an adjuvant (e.g., solution) as described may up to 60 parts by weight, e.g., at least 5 parts by weight and up to or greater than 20, 30, 40, or 50, parts by weight amine surfactant or amine surfactant ingredient, based on 100 parts by weight adjuvant (e.g., based on 100 parts by weight total: amine surfactant or amine surfactant ingredient, oil or oil ingredient, lecithin or lecithin ingredient, emulsifier or emulsifier ingredient, and optional acid or water in an adjuvant composition). Alternately, an adjuvant can contain up to 60 weight percent, e.g., at least 5 weight percent and up to or greater than 20, 30, 40, or 50, weight percent amine surfactant or amine surfactant ingredient based on total weight adjuvant (e.g., based on total weight: amine surfactant or amine surfactant ingredient, oil or oil ingredient, lecithin or lecithin ingredient, and emulsifier or emulsifier ingredient, and optional acid or water in an adjuvant composition).

The adjuvant includes oil, which can be any oil material that can function as a carrier or solvent for other ingredients of the adjuvant, and which becomes emulsified when combined with water in a herbicide application composition. Suitable oils include fatty acid esters, seed oils, petroleum oils, fatty acids, fatty alcohols, fatty ethers, fatty amides, glycerides, and mixtures of two or more of these. An oil is commonly included in an agricultural adjuvant based on its ability to soften the outer waxy layer of a plant surface, thereby enabling the biologically active substance (active herbicide compound) to better penetrate into the plant.

Fatty acid esters useful as the oil include those having the general formula:

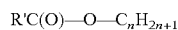

$$R'C(O)-O-C_nH_{2n+1}$$

wherein R' is an alkyl radical having from about 4 to about 22 carbon atoms, and n is a number from 1-4, e.g., n=1 for a fatty acid methyl ester and n=2 for a fatty acid ethyl ester. These ester compounds can be derived by the esterification of a fatty acid with an alkanol. Preferred fatty acid esters are methyl and ethyl esters derived from the esterification of unsaturated fatty acids having from about 18 to about 22 carbon atoms. Common methyl esters include methyl oleate, methyl laurate, and methyl soyate. Common ethyl esters include ethyl oleate and ethyl canolate. Suitable fatty acids from which the fatty acid esters may be derived include, but are not limited to, coconut, soy and other vegetable oils, tallow, etc.

Another example of a type of useful oil is alkoxylated fatty acid esters. These include fatty acid esters such as those listed above, which are alkoxylated with ethylene oxide, propylene oxide, and combinations thereof.

Fatty alcohols that may be used as the oil include saturated or unsaturated, branched or linear $C_8$-$C_{20}$ alcohols, e.g., $C_8$-$C_{20}$ alcohols.

Fatty acids that may be used as the oil include those composed of an alkyl group containing from 4 to 22 carbon atoms, and a terminal carboxyl group. The fatty acid may be saturated such as, for example, butyric, lauric, palmitic, and stearic, or unsaturated such as, for example, oleic, and linolenic.

Seed oils, useful as the oil include those derived from vegetables, seeds, and nuts, and include, but are not limited to, castor oil, coconut oil, soybean oil, vegetable oils, and the like. Preferred seed oils include soybean oil. Soybean oil can be processed further to produce methylated or ethylated seed oils, commonly referred by the abbreviations MSO and ESO. MSOs and ESOs can be produced by hydrolysis (cleaving) of the glycerol molecule from the fatty acids. The fatty acids are then separated from the glycerol molecule and other water soluble components and esterified with methanol (to produce MSO) or ethanol (to produce ESO).

Useful petroleum oils include, but are not limited to, petroleum and petroleum-derived oils such as mineral oil.

The oil can be liquid at ambient temperature, such as at a temperature in a range from 40 to 70 degrees Fahrenheit. As used herein, the term "oil" is used to refer to the compounds chemically defined herein as an oil. The term "oil ingredient" refers to a composition that includes a high concentration of oil, such as at least 70, 80, 90, or 95 weight percent oil. An oil ingredient can include the oil as one constituent, and can contain low amounts of water and non-oil materials (e.g., impurities or a co-ingredient such as a surfactant), preferably less than 10, 5, 2, or 1 percent of these or other non-oil materials based on the total weight of an oil ingredient. When used in the present application and claims, the term "oil" refers to oil compounds themselves, and the term "oil ingredient" refers to a composition that contains one or more oil (compound), which may be a commercially obtained material, that can also include low levels of non-oil impurities, co-ingredients, and water.

The amount of oil or oil ingredient in the adjuvant can be any amount that will be useful to function as a component of an adjuvant as described herein, to contain other ingredients of the adjuvant in a stable form, and to allow the adjuvant to be combined with a herbicide composition to produce a useful herbicide application composition, especially in the form of an oil-in water emulsion. Exemplary amounts of oil or oil ingredient in an adjuvant (e.g., solution) as described may be least 20 parts by weight, and at least or up to 25, 30, 40, 50, 60, 70, 80, or 90 parts by weight oil or oil ingredient, based on 100 parts by weight adjuvant. Alternately, an adjuvant can contain at least 20 weight percent, and at least or up to 25, 30, 40, 50, 60, 70, 80, or 90 weight percent oil or oil ingredient based on total weight adjuvant.

The adjuvant also contains lecithin. Lecithin is any of a group of phospholipid compounds that are made up of units of choline, phosphoric acid, fatty acids, and glycerol; that are amphiphilic; and that are present in animal tissue, plant tissue, and egg yolk. The term lecithin is used to generically designate any of these materials. Glycerophospholipids in lecithin include phosphatidylcholine, phosphatidylethanolamine, phosphatidylinositol, phosphatidylserine, and phosphatidic acid.

Lecithin can be obtained by water degumming the extracted oil of seeds. This produces lecithin that contains a mixture of various phospholipids, the makeup of which depends on the origin. One common source of lecithin is soybean oil, and another is sunflower. The main phospholipids in lecithin from soya and sunflower are phosphatidyl choline, phosphatidyl inositol, phosphatidyl ethanolamine, and phosphatidic acid. They often are abbreviated to PC, PI, PE, and PA, respectively.

Lecithin is produced and available commercially in various forms of powder, gel, or liquid. The lecithin can be relatively pure, or in the form an ingredient that contains phospholipids (of choline, phosphoric acid, fatty acids, and glycerol) in combination with non-phospholipid materials, and other co-ingredients such as oil.

As used herein, the term "lecithin" refers to phospholipid compounds chemically defined herein as the lecithin, meaning phospholipid compounds that are made up of units of choline, phosphoric acid, fatty acids, and glycerol, including glycerophospholipids such as phosphatidylcholine, phosphatidylethanolamine, phosphatidylinositol, phosphatidylserine, and phosphatidic acid.

The term "lecithin ingredient" refers to a composition that includes a high concentration of lecithin as defined (phospholipid compounds), such as at least 70, 80, 90, or 95 percent of lecithin as defined. The lecithin can be one constituent of the lecithin ingredient, which can optionally contain low amounts of oil, water, or other non-lecithin, non-phospholipid materials (e.g., impurities or co-ingredients), preferably less than 10, 5, 2, or 1 percent of these or other non-lecithin materials based on the total weight of a lecithin ingredient. When used in the present application and claims, the term "lecithin" refers to lecithin as defined (phospholipid compounds), and the term "lecithin ingredient" refers to a composition that contains the lecithin, which may be a commercially obtained material, that can also include low levels (e.g., less than 20, 10, or 5 weight percent) of non-lecithin impurities, co-ingredients, and water.

The adjuvant contains emulsifier, which is a substance different from an amine surfactant as described herein if contained in the same adjuvant, and that that promotes the formation of an emulsion and stabilizes an emulsion. When the oil-based adjuvant is mixed with an aqueous herbicide application composition, the oil in the adjuvant becomes emulsified, meaning that particles or droplets of the oil-based adjuvant become suspended in a continuous aqueous phase of the herbicide application composition. The emulsifier in the adjuvant is effective to allow or to cause the formation of that emulsion, and to stabilize that emulsion. Preferred adjuvants can include emulsifier that results in improved performance of the herbicide application composition by reducing the volatility of active herbicide compound (e.g., auxin herbicide) in the herbicide application composition and optionally by reducing drift.

According to the present description, the emulsifier can be one or a combination of surface active agents that can cause the formation of an oil-in-water emulsion when the oil-based adjuvant is combined with excess water, e.g., to form a tank mixture or "herbicide application composition." Preferred emulsifiers, especially combinations of two or more emulsifiers, are effective to reduce the volatility of auxin herbicide in a herbicide application composition prepared by combining the adjuvant with herbicide composition, and water, as described. Preferred emulsifiers can also, optionally, reduce drift of the herbicide application composition when applied by spraying.

The emulsifier can be any single emulsifier or combination of two or more emulsifiers that can produce an adjuvant (or herbicide application composition) as described. The emulsifier can be anionic, cationic, or non-ionic (when present in a herbicide application composition), or can include a combination of anionic, cationic, and non-ionic emulsifiers.

Examples of non-ionic emulsifiers include alkoxylated castor oil, alkoxylated polyarylphenols, alkoxylated alkyl phenols, alkoxylated alkylarylphenols, and alkoxylated fatty alcohols, as well as mixtures thereof. More specific examples include alkoxylated acetylenic diols, polyoxyalkylene mono- and di(C8-20 alkyl)phenylethers, polyoxyalkylene di- and tristyrylphenylethers, block copolymers of ethylene oxide and propylene oxide and C2-6 alkyl adducts thereof, sorbitan C8-20 mono-, di- and tri(C8-20 fatty acid) esters, polyoxyalkylene sorbitan mono-, di- and tri(C8-20 fatty acid) esters, sucrose esters and C8-20 alkyl polyglycosides.

Commercially available examples of non-ionic emulsifiers include the following: those commercially available under the trade names POLYSORBATE 80 (aka, Tween 80; Polyoxyethylene (20) sorbitan monooleate) (CAS No.: 9005-65-6) (HLB=15); Tween 20 (Polyoxyethylene sorbitan monolaurate) (CAS No.: 9005-64-5), Tween 85 (aka emulsifier T-85) (CAS No.: 9005-70-3) (HLB=11.0); those sold BY Dow Chemical under the trade name TRITON (e.g. TRITON X-100) (aka octylphenol ethoxylate) (HLB=13.4);

Examples of useful anionic emulsifiers include calcium-dodecylbenzene sulfonate, di-octyl sulfosuccinate, sulfated or phosphated alkoxylated fatty alcohols, sulfated or phosphated alkoxylated alkylaryl phenols, and combinations of these. Some more specific examples include C8-20 alkyl carboxylates including fatty acids, C8-20 alcohol sulfates, C8-20 alcohol phosphate mono- and diesters, C8-20 alcohol and (C8-20 alkyl)phenol polyoxyethylene ether carboxylates, sulfates and sulfonates, C8-20 alcohol and (C8-20 alkyl)phenol polyoxyethylene phosphate mono- and diesters, C8-20 alkylbenzene sulfonates, naphthalene sulfonates and formaldehyde condensates thereof, lignosulfonates, C8-20 alkyl sulfosuccinates and sulfosuccinamates, C8-20 alkyl polyoxyethylene sulfosuccinates and sulfosuccinamates, and C8-20 acyl glutamates, sarcosinates, isethionates and taurates. Cationic counterions accompanying an anionic emulsifier can preferably be monovalent, e.g., hydrogen, sodium, potassium, ammonium, and monovalent organic ammonium cations (isopropylamine).

Commercially available examples of non-ionic emulsifiers include the following: Rhodocal BE (linear dodecylbenzensulphonic acid, calcium salt); BIO-SOFT® N-411 (linear dodecylbenzensulphonic isopropylamine salt); tristyrylphenol ethoxylate (e.g., sold under the trade name LUCRAMUL, from Levaco Chemicals).

Emulsifier can be added to an adjuvant (or other ingredients of an adjuvant) either in a pure or relatively form, or in combination with one or more other materials or other ingredients of the adjuvant. For example, certain concentrated oil (crop oil) products and certain surfactant products include emulsifier. As used herein, the term "emulsifier" refers to the compounds chemically defined herein as an emulsifier. The term "emulsifier ingredient" refers to a composition that includes a high concentration of emulsifier (i.e., emulsifier compound), such as at least 70, 80, 90, or 95 percent emulsifier. An emulsifier ingredient can include emulsifier as one component of the emulsifier ingredient, and can optionally contain low amounts of water and non-emulsifier materials (e.g., impurities or co-ingredients), preferably less than 10, 5, 2, or 1 percent of these or other non-emulsifier materials based on the total weight of an emulsifier ingredient. When used in the present application and claims, the term "emulsifier" refers to emulsifier compound, and the term "emulsifier ingredient" refers to a composition that contains one or more emulsifier, which may be a commercially obtained material that can also include low levels of non-emulsifier impurities, co-ingredients, oil, or water.

The amount of emulsifier or emulsifier ingredient in the adjuvant can be any amount that will be useful to provide an adjuvant, or a derivative thereof (herbicide application composition), that will function as desired and as described herein. Exemplary amounts of emulsifier or emulsifier ingredient in an adjuvant (e.g., solution) as described may be least 1 parts by weight, and at least 2 parts by weight or up to 10, 20, 25, 30, 35, or 40 parts by weight emulsifier or emulsifier ingredient, based on 100 parts by weight adjuvant. Alternately, an adjuvant can contain at least 1 or 2 weight percent, and at least or up to 10, 20, 25, 30, 35, or 40 weight percent emulsifier or emulsifier ingredient based on total weight adjuvant.

The adjuvant can include any useful amounts of the oil (or oil ingredient), amine surfactant (or amine surfactant ingredient), lecithin (or lecithin ingredient), and emulsifier (or emulsifier ingredient), and preferably a low amount of water. Example amounts can be from greater than zero to up to about 60 parts by weight amine surfactant or amine surfactant ingredient, from 20 to 90 parts by weight oil or oil ingredient, from 10 to 40 parts by weight lecithin or lecithin ingredient, from 2 to 40 parts by weigh emulsifier or emulsifier ingredient, and not more than 7 parts by weight water, based on 100 parts by weight adjuvant. Alternately, in terms of weight percent, example amounts can be up to about 60 weight percent amine surfactant or amine surfactant ingredient, from 20 to 90 weight percent oil or oil ingredient, from 10 to 40 weight percent lecithin or lecithin ingredient, from 2 to 40 weigh percent emulsifier or emulsifier ingredient, and not more than 7 weight percent water, based on total weight adjuvant.

More specific example amounts can be from 5 about 50 parts by weight amine surfactant or amine surfactant ingredient, from 20 to 70 parts by weight oil or oil ingredient, from 15 to 35 parts by weight lecithin or lecithin ingredient, from 3 to 30 parts by weigh emulsifier or emulsifier ingredient, and not more than 5 or 3 parts by weight water, based on 100 parts by weight adjuvant. Alternately, in terms of weight percent, example amounts can be up to about 5 to 50 weight percent amine surfactant or amine surfactant ingredient, from 20 to 70 weight percent oil or oil ingredient, from 15 to 35 weight percent lecithin or lecithin ingredient, from 3 to 30 weigh percent emulsifier or emulsifier ingredient, and not more than 5 or 3 weight percent water, based on total weight adjuvant.

Aside from being the main or exclusive constituents of an adjuvant, in these relative amounts, the invention contemplates using these same relative amounts (in parts by weight) of these adjuvant materials in non-adjuvant compositions such as in a herbicide composition (e.g., an aqueous herbicide application composition), which can contain additional ingredients such as water, active herbicide compounds, etc. Example compositions (e.g., herbicide application compositions, diluted with a high percentage of water) can include these adjuvant ingredients in amounts as described herein as part of the adjuvant, for example in a range from 5 to about 60 parts by weight amine surfactant or amine surfactant ingredient, from 20 to 90 parts by weight oil or oil ingredient, from 10 to 40 parts by weight lecithin or lecithin ingredient, and from 2 to 40 parts by weight emulsifier or emulsifier ingredient, based on 100 total parts by weight amine surfactant or amine surfactant ingredient, oil or oil ingredient, lecithin or lecithin ingredient, and emulsifier or emulsifier ingredient, in the composition (e.g., herbicide application composition).

Any of the adjuvant compositions generally or specifically described herein can also include a very low amount of water (moisture), such as below 1 percent, e.g., below 0.5 or 0.1 weight percent moisture, from any source, based on the weight of the adjuvant.

Optionally, though not required, an adjuvant as described may contain other additives or minor ingredients such as at least one dye, stabilizer, or antimicrobial agent. Such an ingredient may be included in a relatively low amount such as below about 5, 3, 2, 1, or 0.5 weight percent based on the total weight of the adjuvant.

Example adjuvants can consist of or can consist essentially of the oil or oil ingredient, amine surfactant or amine surfactant ingredient, lecithin or lecithin ingredient, and emulsifier or emulsifier ingredient. An adjuvant or other composition that consists essentially of specified materials is one that contains not more than 5 weight percent, e.g., less than 2 weight percent, preferably less than 1, 0.5, or 0.1 weight percent of other materials or ingredients different from the specified materials. An adjuvant or other composition that consists of specified materials is one that contains no other materials or ingredients different from the specified materials.

Example adjuvants do not require and can specifically exclude one or more of: fertilizer, acid (e.g., inorganic acid or concentrated inorganic acid), surfactant different from amine surfactant described herein, emulsifier different from those described herein, any biologically active ingredients such as herbicide, pesticide, fungicide, insecticide, as these terms are used to refer to active chemical ingredients in the agricultural arts that are used (e.g., sold commercially) for the purpose of killing, insects, fungi, etc.

The adjuvant does not need to contain, and can optionally exclude, inorganic acid or concentrated inorganic acid. Preferred adjuvants can include not more than 5, 3, 2, or 1 weight percent inorganic acid or concentrated inorganic acid based on the total weight of the adjuvant.

The adjuvant does not need to contain, and can exclude, active herbicide ingredient (including pesticides, fungicides, and the like). Preferred adjuvants can include not more than 5, 3, 2, or 1 weight percent active herbicide based on the total weight of the adjuvant.

The adjuvant does not need to contain and can exclude fertilizer as this term is understood in the agricultural arts, e.g., any material of natural or synthetic origin that is applied to soil or to plant tissue (usually leaves) to supply one or more plant nutrients essential to plant growth. Examples include nitrogen fertilizers such as ammonia ($NH_3$), urea, anhydrous ammonium nitrate, and nitrogen ($N_2$); phosphate fertilizers that contain phosphate anion $PO_4^{3-}$; and potassium fertilizers. Preferred adjuvants can contain not more than 5, 3, 2, or 1 weight percent fertilizer based on the total weight of the adjuvant.

According to certain specific embodiments, an adjuvant also does not require and can exclude additional surfactant, emulsifier, or surface active agent, especially some that have been described as useful to reduce volatility of active herbicide compounds in herbicide application compositions. Examples of these compounds include cationic polyamine compounds such as those described in U.S. Pat. No. 8,987,167 (the entirety of which is incorporated herein by reference), and polybasic polymer such as those described in United States Patent Publication 2012/0142532 (the entirety of which is incorporated herein by reference). Example adjuvants can include less than 2, 1, 0.5, or 0.1 weight percent of these or other cationic polyamine compounds, and less than 2, 1, 0.5, or 0.1 weight percent of these or other polybasic polymers.

Optionally, the adjuvant can contain inorganic acid of a type and in an amount useful to reduce pH of a herbicide application composition prepared by combining the adjuvant with a herbicide composition (and optional spray water). The inorganic acid may be any of a variety of suitable inorganic acids capable of achieving a desirably low pH of a herbicide application composition, when the adjuvant is included in the herbicide application composition. The inorganic acid may be of any useful concentration.

Concentrated acids are acids that contain a high or maximum amount of acid material in the presence of a low or minimum amount of water possible for the particular acid, and that do not contain a substantial amount of other materials, e.g., less than 5, 3, 2, or 1 percent of materials other than the acid and water. Examples of known concentrated acids include concentrated forms of sulfuric acid, phosphoric acid, hydrochloric acid, nitric acid, acetic acid (e.g., "glacial" acidic acid), perchloric acid, and polyphosphoric acid. Different inorganic acids are capable of being combined with different minimum amounts of water in a concentrated form. The following table shows some examples of acids considered to be concentrated, and representative molar concentrations. See Table 1.

TABLE 1

| Acetic Acid, glacial, 100% | 17 Molar |
| Hydrochloric Acid, 37% | 12 Molar |
| Nitric Acid, 70% | 16 Molar |
| Phosphoric Acid, 85% | 15 Molar (45 Normal) |
| Perchloric Acid, 71% | 11 Molar |
| Sulfuric Acid, 96% | 18 Molar (36 Normal) |

To be considered "concentrated" or to otherwise be considered to contain a relatively low amount of water according to this description, an acid is not required to contain an absolute minimum amount of water that can be present in a particular type of acid. Instead, an acid is considered to be concentrated or to contain a relatively low amount of water if the amount of water in the acid is in a range that approaches the minimum amount that can be present, e.g., within 5, 10, or 20 percentage points from the minimum (the minimum amount being the same as the concentration of water in the "concentrated" form of an acid). As an example to illustrate the meaning of these ranges, an amount of water that is sometimes understood to be a minimum in sulfuric acid is 2 or 4 percent (i.e., in 96 or 98 percent concentrated sulfuric acid). Sulfuric acid having an amount of water that is within 20 or 10 percentage points of this minimum water content includes sulfuric acid having up to 22 or 24 percent water (i.e., 76 or 78 percent sulfuric acid), and sulfuric acid having up to 12 or 14 percent water (i.e., 86 or 88 percent sulfuric acid), respectively.

Examples of acids that are also considered to be "concentrated acids" include water combined with acid in the following acid concentrations: sulfuric acid that is more than 90 percent concentrated, perchloric acid that is more than 50 percent concentrated, hydroiodic acid that is more than 40 percent concentrated, hydrobromic acid that is more than 50 percent concentrated, hydrochloric acid that is more than 25 percent concentrated, and nitric acid that is more than 60 percent concentrated.

Stated differently, an inorganic acid can be concentrated to include a minimum amount of water for the type of the acid, or may be a concentrated acid that is diluted with some amount of water, e.g., 10, 20, 25, or 30 weight percent water based on the total weight of the concentrated acid and water added for the dilution. The amount of water added to the concentrated acid should not be so high that the water will cause an adverse effect in an adjuvant (or its usefulness or stability) prepared by combining the (water-containing) inorganic acid with the oil, amine surfactant, lecithin, emulsifier, when forming the adjuvant.

If an inorganic acid is combined with the adjuvant or one or more of its ingredients, in the presence of not more than a low amount of water, this should be done in a manner that does not allow the inorganic acid to cause a substantial or undue negative effect in the adjuvant or its ingredients, including that: the inorganic acid should not substantially react with another ingredient of the adjuvant, especially anionic surfactant, lecithin, or emulsifier, in a manner that causes more than an insubstantial amount of degradation; the inorganic acid should not cause the formation and precipitation of solid material in the adjuvant; the inorganic acid should not produce coagulation of solid materials in the adjuvant; the inorganic acid preferably does not produce a long-lasting cloudy appearance in the adjuvant; and the inorganic acid should not cause an undue viscosity increase, gumming, or other change in the rheology of the adjuvant that would prevent the smooth flow of the adjuvant such as during pumping at ambient temperature (e.g., 72 degrees Fahrenheit). Preferably a resultant adjuvant that contains inorganic acid may be non-cloudy, clear and colorless, or may be non-cloudy and transparent but exhibit some degree of coloration, e.g., light brown to brown coloration.

The amount of the inorganic acid in an adjuvant can be any desired amount, such as an amount that is sufficient (based on the type and concentration of the acid) to cause a herbicide application composition to achieve a desirably low pH, when the adjuvant is included in the herbicide application composition, such as a pH that is below 5.

Preferred concentrates can be stable for a period of weeks or months without experiencing undue coagulation, more than an insubstantial amount of viscosity build, or more than an insubstantial amount of precipitation (preferably no precipitation). For example, preferred concentrates are storage-stable for up to (12, e.g., 24 months) at ambient temperature (72 degrees Fahrenheit) without forming precipitate, without coagulation, and while maintaining a form that remains flowable (pourable and pumpable).

An adjuvant as described can be prepared by any method found to be useful. Example methods are any that are effective to combine adjuvant materials as described, including amine surfactant or amine surfactant ingredient, oil or oil ingredient, lecithin or lecithin ingredient, and emulsifier or emulsifier ingredient, in amounts as described, to form a combination or mixture (e.g., solution) of these materials. Useful methods are effective to prepare an adjuvant that contains concentrated amounts of oil, lecithin, amine surfactant, and emulsifier, with not more than small amount of water or other materials.

A preferred method of preparation is to begin with an amount of oil or oil ingredient (e.g., methylated seed oil and fatty acid methyl esters). Lecithin (Solec E from the Solea Company) can be added under continuous mixing until the lecithin goes into solution. The mixture should be homogenous at this time. Amine surfactant can be combined with the oil and lecithin, e.g., tallow amine, (Terwet 3780 from the Huntsman Corporation). Continuous mixing can be maintained until the whole mixture become homogenous. Emulsifier can be mixed into the homogeneous mixture (e.g., solution) in the same manner, with continuous stirring, to produce an adjuvant as described in the form of a homogeneous solution.

An alternate method can begin with oil or oil ingredient (e.g., a mixture of methylated seed oil and fatty acid methyl esters). With continuous mixing, lecithin (Solec E) from the Solea Company can be added until the lecithin goes into a homogeneous solution. Next, to this homogeneous solution can be added a nonionic emulsifier such as Tween 85. Also at this time an anionic emulsifier can be added (e.g., isopropylamine dodecybenzene sulfonate, From the Stephan Corporation). When the mixture is homogenous, amine surfactant can be added, with continuous stirring, to produce an adjuvant as described in the form of a homogeneous solution.

An adjuvant as described can be useful as part of an aqueous herbicide application composition by combining the adjuvant with herbicide composition, water, or both. For example, the adjuvant, a herbicide concentrate, and water (e.g., "spray water") can be added to a tank (e.g., a spray tank), with mixing, to form an aqueous herbicide application composition. Other optional ingredients can also be included such as one or more of a water conditioner, acidifier, buffer, fertilizer, other surface active agent, etc.

A herbicide concentrate is a concentrated herbicide composition that is adapted to be diluted in this manner, and applied to a plant, crop, or soil, in the diluted form. Countless examples of herbicide concentrates are known and sold commercially. Examples can include a combination of active herbicide compound (or a mixture thereof) with one or more non-herbicide ingredients such as conditioner, surfactant, emulsifier, an aqueous or water-based carrier, or the like. Example herbicide concentrates can contain at least about 2, e.g., 2.5 pounds of herbicide per gallon concentrate, e.g., at least about 3, 3.5, 4, or up to or in excess of about 4, 5, or 6 pounds acid herbicide per gallon herbicide concentrate.

In alternate methods, amounts of other ingredients or materials can be added separately to a herbicide composition, e.g., a herbicide application composition, wherein those ingredients combine to result in the herbicide composition containing relative amounts of adjuvant materials (in parts by weight) that are consistent with the amounts of those materials that are present in an adjuvant composition as described herein. In effect, the adjuvant composition is formed in situ, in the herbicide composition, by combining the adjuvant materials, or ingredients of the herbicide application composition, in situ, with formation of the herbicide composition. The herbicide composition that includes the same materials as the adjuvant, in the same relative amounts, may be formed by steps that do not include the use of a discrete (single) "adjuvant" composition as described herein, that contains all of the adjuvant materials. A composition may contain herbicide (from herbicide concentrate) diluted with a large amount of water and the adjuvant materials in relative amounts (in parts by weight) as described herein.

The herbicide application composition, regardless of the manner or materials used for its formation, can contain the adjuvant materials described herein, in the relative amounts described herein, such that the herbicide application composition may (preferably) exhibit useful or advantageous performance properties such as reduced volatility of an active herbicide compound, e.g., an auxin herbicide, and optionally reduced loss or off-target application when applied by spraying, i.e., "drift." To form this composition, the adjuvant materials may be added separately, e.g., as part of one or more different ingredients (e.g., amine surfactant or amine surfactant ingredient, lecithin or lecithin ingredient, emulsifier or emulsifier ingredient, oil or oil ingredient, herbicide concentrate, or another adjuvant or additive that is different from an "adjuvant" as described). The combined ingredients, which together include amounts of the adjuvant materials as described, in the described relative amounts, can produce a herbicide application compositions that contains the same materials as are in the adjuvant composition as described (the "adjuvant materials"), in the same relative amounts, but without the adjuvant materials being added in a single step of adding an "adjuvant" composition as described.

Examples of such compositions (e.g., herbicide application compositions) can include, from any source or separate sources: from 5 to about 60 parts by weight amine surfactant or amine surfactant ingredient, from 20 to 90 parts by weight oil or oil ingredient, from 10 to 40 parts by weight lecithin or lecithin ingredient, and from 2 to 40 parts by weigh emulsifier or emulsifier ingredient, based on 100 parts by weight amine surfactant or amine surfactant ingredient, oil or oil ingredient, lecithin or lecithin ingredient, and emulsifier or emulsifier ingredient, in the composition (e.g., herbicide application composition). Other examples can include from 5 to about 50 parts by weight amine surfactant or amine surfactant ingredient, from 20 to 70 parts by weight oil or oil ingredient, from 10 to 40 (e.g., 12 to 35) parts by weight lecithin or lecithin ingredient, and from 2 to 40 (e.g., 3 to 30) parts by weigh emulsifier or emulsifier ingredient, based on 100 parts by weight amine surfactant or amine surfactant ingredient, oil or oil ingredient, lecithin or lecithin ingredient, and emulsifier or emulsifier ingredient, in the composition (e.g., herbicide application composition).

The herbicide application composition may take any useful form, with certain preferred forms being an aqueous solution (containing active herbicide in the form of a water soluble salt), an emulsion, a microemulsion, a suspension, or another form of flowable liquid that may be prepared in a tank by combining the adjuvant or adjuvant materials with an aqueous composition that contains water and herbicide.

The herbicide application composition can be prepared in any manner, such as by combining a concentrated herbicide composition with water, in a spray tank, before, during, or after combining one or both of these ingredients with the adjuvant or separate ingredients that contain relative amounts of the adjuvant materials that would be present in an adjuvant composition as described. A herbicide application composition is typically formed shortly before the composition is to be applied by spraying onto a field, oil, crop, or plant (e.g., weed). The resultant herbicide application composition may be applied to a field or to a plant (crop, weed, or both) or area of plants by spraying, as is known, by passing the herbicide application composition through a nozzle with pressure.

According to certain specific embodiments, a herbicide application composition can contain other additives such as a conditioner, pH-adjusting agent (e.g., acidifier, buffer), stabilizer, defoamer, and other ingredients, in amounts useful to improve efficacy or ease of application of the herbicide application composition. Any of these ingredients can be added to a herbicide application composition as part of the adjuvant, as part of an ingredient different from the adjuvant such as in a herbicide concentrate, or separately, when mixing in a spray tank.

In certain embodiments, a herbicide application composition does not require and can specifically exclude additional surfactants, emulsifier, or surface active agents, that are different from the presently-described anionic surfactant and emulsifier, particularly surfactant, emulsifier, or surface active agent that has the effect of reducing volatility of active herbicide compounds (e.g., auxin) in a herbicide application composition. Examples of these compounds include cationic polyamine compounds such as those described in U.S. Pat. No. 8,987,167 (the entirety of which is incorporated herein by reference), and polybasic polymer such as those described in United States Patent Publication 2012/0142532 (the entirety of which is incorporated herein by reference). Example herbicide application compositions can include less than 1, 0.5, 0.1, or 0.05 weight percent of these or other cationic polyamine compounds, and less than 1, 0.5, 0.1, or 0.05 weight percent of these or other polybasic polymers.

The amount (volume) of water or aqueous herbicide application composition with which a given volume of the adjuvant (or adjuvant materials) can be combined can be any useful amount, and can be selected based on factors such as the concentration of active herbicide compound in the herbicide application composition. Examples of useful relative amounts of water (or aqueous herbicide application composition) that may be combined with the adjuvant (or adjuvant materials) can be in a range from about 20 to 200 parts by volume (e.g., gallons) water or aqueous herbicide application composition per 1 part by volume (e.g., gallon) adjuvant (or adjuvant materials), e.g., up to or in excess of 30, 50, 70, 90, 100, 150, or 200, 400, 600, or 800 parts per volume parts (e.g., gallons) water. A typical use rate may be between 1 pint adjuvant per 100 gallons water (or herbicide application composition) and 2 quarts adjuvant per 100 gallons water (or herbicide application composition).

The amount of active herbicide compound in a herbicide application composition can be as desired based on factors that are known and described above, and in particular on the identity of the specific acid herbicide compound. Advantageously, it has been found that certain preferred herbicide application compositions of the invention exhibit reduced drift and reduced volatility of auxin herbicides. This can allow for a reduced amount of the herbicide to be sprayed onto an area of soil or plant, without a loss of efficacy, because the amount that is sprayed is being used more efficiently and is not being lost to the atmosphere or adjacent space. These preferred herbicide application compositions that contain adjuvant or adjuvant materials as described can be applied at a lower dosage (i.e., a lower use rate, meaning a lower amount of the herbicide compound per plant or per acre) relative to comparable herbicide application compositions that contain the same active herbicide compound or compounds and other optional ingredients but without the adjuvant or adjuvant materials.

Examples of herbicide compound dosages (total, in the form of a single compound or multiple compounds) can be any useful dosage, such as a dosage in the range from about 1/200 or 1/10 to about 15 pounds herbicide compound per acre, with dosages in the range from about 1/100 or 1/5 to about 6 or 10 pounds herbicide compound per acre being sometimes preferred, e.g., from about 0.03 to 0.5 or 1 pound per acre. More resistant plants may require higher concentrations or a higher dosage rate.

Optionally, as desired, the adjuvant can be combined into a herbicide application composition that contains one or more additional surface active ingredients, conditioner, fertilizer, etc. Preferred adjuvants can be mixed in a spray or other tank with many or most herbicides to form a sprayable solution. Preferred adjuvants can be especially suitable for tank mixing with an active herbicide or pesticide that is selected from glyphosate and an auxin herbicide such as dicamba or 2,4-D, e.g., in a salt form.

The described herbicide application compositions can be used for both immediate and long-term control of a large variety of vegetation including those usually found in agricultural fields such as bushes, scrub brush, vines, and other weeds. Illustrative of vegetation that can be controlled by these methods, depending significantly on the identity of the active herbicide compound, are: black mustard (*brassica nigra*), curly dock (*rumex crispus*), common groundsel (*senecio vulgaris*), pineapple weed (*matricaria matricarioides*), swamp smartweed (kelp) (*polygonum coccineum*), prickly lettus (*lactuca scariola*), lance-leaved groundcherry (*physalis lanceifolia*), annual sowthistle (*sonchus oleraceus*), london rocket (*sisymbrium irio*), common fiddleneck (*amsinckia intermedia*), hairy nightshade (*solanum sarrachoides*), shepherd's purse (*capsella bursa-pastoris*), sunflower (*helianthus annus*), common knotweed (*polygonum aviculare*), green amaranth (*amaranthus hybridus*), mare's tail (*conyza canadensis*), henbit (*lamium amplexicaule*), cocklebur (*xanthium strumarium*), cheeseweed (*malva parviflora*), lambsquarters (*chenopodium album*), puncture vine (*tribulus terrestris*) common purslane (*portulaca oleracea*), prostrate spurge (*euphorbia supina*), telegraph plant (*heterotheca grandiflora*), carpetweed (*mollugo verticillata*), yellow starthistle (*centaurea solstitialis*), milk thistle (*silybum marianum*), mayweed (*anthemis cotula*), burning nettle (*urtica urens*), fathen (*atriplex patula*), chickweed (*stellaria media*), scarlet pimpernel (*anagallis arvensis*) redroot pigweed (*amaranthus retroflexus*), minnerslettuce (*montia perfoliata*), turkey mullein (*eremocarpus setigerus*), nettleleaf goosefoot (*chenopodium murale*), prostrate pigweed (*amaranthus blitoides*), silverleaf nightshade (*solanum elaeagnifolium*), hoary cress (*cardaria draba*), largeseed dodder (*cuscuta indecora*), California burclover (*medicago polymorpha*), horse purslane (trianthema portulacastrum), field bindweed (*Iconvolvulus arvensis*), Russian knapweed (*centaurea repens*), flax-leaved fleabane (*conyza bonariensis*), wild radish (*raphanus sativus*), tumble pigweed (*amaranthus albus*), stephanomeria (*stephanomeria exigua*), wild turnip (*brassica campestris*), buffalo goard (*cucurbita foetidissima*), common mullein (*verbascum thapsus*), dandelion (*taraxacum officinale*), Spanish thistle (*xanthium spinosum*), chicory (*cichorium intybus*), sweet anise (*foeniculum vulgare*), annual yellow sweetclover (*melilotus indica*), poison hemlock (*conium maculatum*), broadleaf filaree (*erodium botrys*), whitestem filaree (*erodium moschatum*), redstem filaree (*erodium cicutarium*), ivyleaf morning-glory (*ipomea hederacea*), shortpod mustard (*brassica geniculata*), buckhom plantain (*plantago lacenolata*), sticky chickweed (*cerastium viscosum*), himalaya blackberry (*rubus* procerus), purslane speedwell (*veronica peregrina*), Mexican tea (*chenopodium ambrosioides*), Spanish clover (*lotus purshianus*), Australian brassbuttons (*cotula australis*), goldenrod (*solidago californica*), citron (*citrullus lanatus*), hedge mustard (*sisymbrium orientale*), black nightshade (*solanum nodiflorum*), Chinese thornapple (*datura ferox*), bristly ox tongue (*picris echioides*), bull thistle (*cirsium vulgare*), spiny sowthistle (*sonchus asper*), Tasmanian goosefoot (*chenopodium pumilio*), goosefoot (*chenopodium botrys*), wright groundcherry (*physalis acutifolia*), tomatillo groundcherry (*physalis philadelphica*), pretty spurge (*euphorbia peplus*), bitter apple (*cucumis myriocarpus*), indian tobacco (*nicotiana bigelovii*), common morning-glory (*ipomoea purpurea*), waterplantain (*alisma triviale*), smartweed (*polygonum lapathifolium*), mature sowthistle (*sonchus asper*), yellow nutsedge (*cyperus esculentus*), purple nutsedge (*cyperus rotundus*), lupine (*lupinus formosus*), and grasses of the family Gramineae such as annual rye grass, blue grass, water grass, barnyard grass, bermuda grass, fescue, mat grass, Johnson grass, and the like.

Preferred herbicide application compositions as described herein can exhibit the advantage of being relatively non-volatile compared to other herbicide compositions. The advantage of a non-volatile herbicide composition will be appreciated by the skilled person in the herbicide chemicals arts. A non-volatile herbicide composition, after application to a plant or field, has the advantage of not evolving, or evolving to a reduced degree, through the air. The reduced volatility reduces the occurrence of inadvertent contact of the herbicide with adjacent or nearby, desired plant growth. In practical effect, this advantageous property allows a herbicide application composition as described to be applied to undesired plant growth in greater strength or in closer proximity to desired above-ground plant growth.

The invention claimed is:

1. An agricultural adjuvant comprising

From 5 to 60 parts by weight amine surfactant,
from 20 to 90 parts by weight oil,
from 10 to 40 parts by weight lecithin,
from 2 to 40 parts by weight emulsifier, and
less than 10 parts by weight water, based on 100 parts by weight adjuvant, wherein, the emulsifier comprises a first emulsifier and a second emulsifier, the first emulsifier being non-ionic and the second emulsifier being anionic, and wherein the agricultural adjuvant does not cause an increase in volatility of an auxin herbicide in a herbicide composition that contains the agricultural adjuvant and the auxin herbicide, relative to a volatility of an auxin herbicide in an otherwise identical herbicide composition that does not contain the agricultural adjuvant, wherein the composition does not contain inorganic acid.

2. The agricultural adjuvant as recited at claim 1 comprising
from 5 to 50 parts by weight amine surfactant,
from 20 to 70 parts by weight oil,
from 10 to 40 parts by weight lecithin,
from 2 to 40 parts by weight emulsifier, and
less than 2 parts by weight water, based on 100 parts by weight adjuvant.

3. The agricultural adjuvant as recited at claim 1 comprising anionic emulsifier selected from salts of dodecylbenzensulphonic acid.

4. The agricultural adjuvant as recited at claim 1 comprising anionic emulsifier selected from a calcium salt of linear dodecylbenzensulphonic acid, an isopropylamine salt of linear dodecylbenzensulphonic acid, and combinations thereof.

5. The agricultural adjuvant as recited at claim 1 comprising from 2 to 15 parts by weight anionic emulsifier.

6. The agricultural adjuvant as recited at claim 1 comprising from 2 to 25 parts by weight nonionic emulsifier.

7. The agricultural adjuvant as recited at claim 1 wherein the amine surfactant is an alkyl amine surfactant, a polyalkoxylated amine surfactant, or tallow amine surfactant.

8. The agricultural adjuvant as recited at claim 1 wherein the amine surfactant is at least 75 weight percent ethoxylated tallow amine surfactant.

9. The agricultural adjuvant as recited at claim 1 wherein the volatility of auxin herbicide in the herbicide composition is reduced by at least 50 percent compared to the volatility of the auxin herbicide in the herbicide composition without the adjuvant.

10. The agricultural adjuvant as recited at claim 1 wherein the auxin herbicide is a 2,4-D salt, a dicamba salt, or a combination thereof.

11. The agricultural adjuvant as recited at claim 1 comprising glyphosate.

12. A herbicide composition comprising:
herbicide selected from 2,4-D salt and dicamba salt,
adjuvant as recited at claim 1.

13. A herbicide composition as recited at claim 12 wherein the volatility of the herbicide in the herbicide composition is reduced compared to the volatility of the herbicide in an otherwise identical herbicide composition without the adjuvant.

14. A herbicide composition as recited at claim 12 wherein the volatility of the herbicide in the herbicide composition is reduced by at least 50 percent compared to the volatility of the herbicide in an otherwise identical herbicide composition without the adjuvant.

15. The agricultural adjuvant of claim 1 comprising not more than 1 part by weight active herbicide based on 100 parts by weight adjuvant.

16. The agricultural adjuvant of claim 1 comprising less than 2 parts by weight water, based on total weight adjuvant.

17. A method of preparing a herbicide composition, the method comprising:
providing a herbicide composition,
providing adjuvant as recited at claim 1, and
combining the herbicide composition with the adjuvant.

18. An agricultural adjuvant comprising
from 5 to 60 parts by weight amine surfactant,
from 30 to 90 parts by weight oil,
from 10 to 40 parts by weight lecithin,
non-ionic emulsifier and anionic emulsifier, and
less than 10 parts by weight water, based on 100 parts by weight adjuvant, wherein the adjuvant does not contain inorganic acid, and
wherein the adjuvant excludes active herbicide ingredient.

19. The agricultural adjuvant of claim 18 comprising anionic emulsifier selected from salts of dodecylbenzensulphonic acid.

20. The agricultural adjuvant of claim 18 comprising anionic emulsifier selected from a calcium salt of linear dodecylbenzensulphonic acid, an isopropylamine salt of linear dodecylbenzensulphonic acid, and combinations thereof.

21. The agricultural adjuvant of claim 18 comprising from 2 to 15 parts by weight anionic emulsifier and from 2 to 25 parts by weight nonionic emulsifier.

22. The agricultural adjuvant as recited at claim 18 consisting essentially of:
from 5 to 50 parts by weight amine surfactant,
from 30 to 70 parts by weight oil,
from 10 to 40 parts by weight lecithin,
2 to 40 parts by weight emulsifier, and
less than 5 parts by weight water, based on 100 parts by weight adjuvant.

23. The agricultural adjuvant of claim 18 comprising less than 2 parts by weight water, based on total weight adjuvant.

24. The agricultural adjuvant of claim 18 consisting essentially of the oil, amine surfactant, lecithin and emulsifier, and not more than 2 weight percent other ingredients.

* * * * *